US007636934B2

(12) United States Patent  
Baldwin et al.

(10) Patent No.: US 7,636,934 B2
(45) Date of Patent: *Dec. 22, 2009

(54) FAST START-UP FOR DIGITAL VIDEO STREAMS

(75) Inventors: James Armand Baldwin, Redwood City, CA (US); Dustin L. Green, Redmond, WA (US); John H. Grossman, IV, Fremont, CA (US)

(73) Assignee: Microsoft Corporation, Redmond, WA (US)

( * ) Notice: Subject to any disclaimer, the term of this patent is extended or adjusted under 35 U.S.C. 154(b) by 644 days.

This patent is subject to a terminal disclaimer.

(21) Appl. No.: 11/275,047

(22) Filed: Dec. 5, 2005

(65) Prior Publication Data

US 2006/0117359 A1 Jun. 1, 2006

Related U.S. Application Data

(63) Continuation of application No. 10/460,949, filed on Jun. 13, 2003.

(51) Int. Cl.
H04N 7/173 (2006.01)

(52) U.S. Cl. .......................... 725/101; 725/86; 725/84; 725/93

(58) Field of Classification Search .............. 725/101, 725/86
See application file for complete search history.

(56) References Cited

U.S. PATENT DOCUMENTS 5,461,415 A 10/1995 Wolf et al.
5,473,362 A 12/1995 Fitzgerald et al.
5,583,868 A 12/1996 Rashid et al.
5,631,694 A 5/1997 Aggarwal et al.
5,699,362 A 12/1997 Makam
5,724,646 A 3/1998 Ganek et al.
5,732,217 A 3/1998 Emura
5,822,537 A 10/1998 Katseff et al.
5,884,141 A 3/1999 Inoue et al.
5,892,915 A 4/1999 Duso et al.
5,926,230 A 7/1999 Niijima et al.
5,936,659 A 8/1999 Viswanathan et al.
5,963,202 A 10/1999 Polish
6,047,317 A 4/2000 Bisdikian et al.
6,078,594 A 6/2000 Anderson et al.

(Continued)

FOREIGN PATENT DOCUMENTS

CA 2480461 3/2003

(Continued)

OTHER PUBLICATIONS

U.S. Appl. No. 11/010,200; Smith, et al.; Filed Dec. 10, 2004.

(Continued)

Primary Examiner—Christopher Kelley
Assistant Examiner—Farzana Hossain
(74) Attorney, Agent, or Firm—Microsoft Corporation

(57) ABSTRACT

Described herein is a technology facilitating the presentation of digital video streams. An implementation, described herein, reduces the effective start-up delay in the presentation of the first frames of the video content that occurs when a system tunes into a video stream. This abstract itself is not intended to limit the scope of this patent. The scope of the present invention is pointed out in the appending claims.

18 Claims, 9 Drawing Sheets

U.S. PATENT DOCUMENTS

| | | |
|---|---|---|
| 6,118,498 A | 9/2000 | Reitmeier |
| 6,138,147 A | 10/2000 | Weaver et al. |
| 6,222,482 B1 | 4/2001 | Gueziec |
| 6,222,886 B1 | 4/2001 | Yogeshwar |
| 6,266,817 B1 | 7/2001 | Chaddha |
| 6,330,286 B1 | 12/2001 | Lyons et al. |
| 6,418,473 B1 | 7/2002 | St. Maurice et al. |
| 6,430,547 B1 | 8/2002 | Busche et al. |
| 6,496,814 B1 | 12/2002 | Busche |
| 6,505,106 B1 | 1/2003 | Lawrence et al. |
| 6,564,262 B1 | 5/2003 | Chaddha |
| 6,580,754 B1 | 6/2003 | Wan et al. |
| 6,609,149 B1 | 8/2003 | Bandera et al. |
| 6,615,133 B2 | 9/2003 | Boies et al. |
| 6,637,031 B1 | 10/2003 | Chou |
| 6,721,952 B1 | 4/2004 | Guedalia et al. |
| 6,728,965 B1 | 4/2004 | Mao |
| 6,738,980 B2 | 5/2004 | Lin et al. |
| 6,751,129 B1 | 6/2004 | Gongwer |
| 6,751,626 B2 | 6/2004 | Brown et al. |
| 6,757,796 B1 * | 6/2004 | Hofmann ................ 711/159 |
| 6,766,245 B2 | 7/2004 | Padmanabhan |
| 6,842,724 B1 | 1/2005 | Lou et al. |
| 6,856,759 B1 | 2/2005 | Fukuda et al. |
| 6,898,246 B2 | 5/2005 | Katayama |
| 7,051,170 B2 | 5/2006 | Guo |
| 7,158,531 B2 | 1/2007 | Barton |
| 7,334,044 B1 | 2/2008 | Allen |
| 2002/0002708 A1 | 1/2002 | Arye |
| 2002/0024956 A1 | 2/2002 | Keller-Tuberg |
| 2002/0031144 A1 | 3/2002 | Barton |
| 2002/0040481 A1 | 4/2002 | Okada et al. |
| 2002/0107968 A1 | 8/2002 | Horn et al. |
| 2002/0108119 A1 | 8/2002 | Mao et al. |
| 2002/0114331 A1 | 8/2002 | Cheung |
| 2002/0124258 A1 | 9/2002 | Fritsch |
| 2002/0144276 A1 | 10/2002 | Radford et al. |
| 2002/0147979 A1 | 10/2002 | Corson |
| 2002/0147991 A1 | 10/2002 | Furlan et al. |
| 2002/0170067 A1 | 11/2002 | Norstrom et al. |
| 2003/0037331 A1 | 2/2003 | Lee |
| 2003/0060196 A1 | 3/2003 | Levinberg |
| 2003/0093801 A1 | 5/2003 | Lin et al. |
| 2003/0106053 A1 | 6/2003 | Sih et al. |
| 2003/0158899 A1 | 8/2003 | Hughes |
| 2003/0159143 A1 | 8/2003 | Chan |
| 2003/0202594 A1 | 10/2003 | Lainema |
| 2003/0202775 A1 | 10/2003 | Junkersfeld et al. |
| 2004/0003399 A1 | 1/2004 | Cooper |
| 2004/0034863 A1 | 2/2004 | Barrett et al. |
| 2004/0034864 A1 | 2/2004 | Barrett et al. |
| 2004/0049793 A1 | 3/2004 | Chou |
| 2004/0128694 A1 | 7/2004 | Bantz et al. |
| 2004/0160971 A1 | 8/2004 | Krause et al. |
| 2004/0160974 A1 | 8/2004 | Read et al. |
| 2004/0255328 A1 | 12/2004 | Baldwin et al. |
| 2005/0039214 A1 | 2/2005 | Lorenz et al. |
| 2005/0071496 A1 | 3/2005 | Singal et al. |
| 2005/0078680 A1 | 4/2005 | Barrett et al. |
| 2005/0078757 A1 | 4/2005 | Nohrden |
| 2005/0080904 A1 | 4/2005 | Green |
| 2005/0081243 A1 | 4/2005 | Barrett et al. |
| 2005/0081244 A1 | 4/2005 | Barrett et al. |
| 2005/0081246 A1 | 4/2005 | Barrett et al. |
| 2005/0128951 A1 | 6/2005 | Chawla et al. |
| 2005/0154917 A1 | 7/2005 | deCarmo |
| 2005/0172314 A1 | 8/2005 | Krakora et al. |
| 2005/0190781 A1 | 9/2005 | Green et al. |
| 2005/0240961 A1 | 10/2005 | Jerding et al. |
| 2006/0117343 A1 | 6/2006 | Novak et al. |
| 2006/0251082 A1 | 11/2006 | Grossman et al. |
| 2007/0113261 A1 | 5/2007 | Roman et al. |

FOREIGN PATENT DOCUMENTS

| | | |
|---|---|---|
| EP | 0633694 | 1/1995 |
| EP | 1294193 | 3/2003 |
| WO | WO9806045 | 2/1998 |
| WO | WO99/09741 | 2/1999 |
| WO | WO9909741 | 2/1999 |
| WO | WO0009741 | 2/2000 |
| WO | WO0103373 | 1/2001 |
| WO | WO0126271 | 4/2001 |
| WO | WO0156285 | 8/2001 |
| WO | WO02087235 | 10/2002 |
| WO | WO03088646 | 10/2003 |
| WO | WO2004062291 | 7/2004 |

OTHER PUBLICATIONS

Murphy, "Overview Of MPEG", retrieved on Mar. 29, 2007, at <<http://web.archive.org/web/20001203031200/http://www.eeng,dcu.ie/~murphyj/the/the/no . . . >>, pp. 1-3.

Wee et al., "Splicing MPEG Video Streams in the Compressed Domain", IEEE 1997, pp. 224-230.

Hurst et al., "MPEG Splicing: A New Standard for Television-SMPTE 312M", SMPTE Journal, Nov. 1998, pp. 978-988.

Armitage, "Support for Multicast over UNI 3.0/3.1 based ATM Networks", RFC 2022, Standards Track, Nov. 1996, pp. 1-82.

BenAbdelkader, et al., "Combining Holistic and Parametric Approaches for Gait Recognition," Submitted to IEEE Transactions on Pattern Analysis and Machine Intelligence, Dec. 2002, 37 pages.

BenAbdelkader, et al., "EigenGait: Motion-based Recognition of People Using Image Self-similarity," Proc. Intl. on Audio and Video-based Person Authentication (AVBPA), 2001, 11 pages.

BenAbdelkader, et al., "Motion-based Recognition of People in Eigengait Space," 5th International Conference on Automatic Face and Gesture Recognition, May 20, 2002, pp. 1-6.

BenAbdelkader, et al., "Person Identification Using Automatic Height and Stride Estimation," IEEE International Conference on Pattern Recognition, Aug. 11-15, 2002, pp. 1-4.

BenAbdelkader, et al., "Stride and Cadence as a Biometric in Automatic Person Identification and Verification," 5th International Conference on Automatic Face and Gesture Recognition, May 20, 2002, pp. 1-6.

BenAbdelkader, et al., "View-invariant Estimation of Height and Stride for Gait Recognition," Workshop on Biometric Authentication (BIOMET), in association with ECCV 2002, Jun. 1, 2002, 12 pages.

Cutler, et al., "Robust Real-Time Periodic Motion Detection, Analysis, and Applications," IEEE Transactions on Pattern Analysis and Machine Intelligence (PAMI), vol. 22, No. 8, Aug. 2000, pp. 781-796.

"Digital Headend Solutions; Tune in to Digital TV", retrieved from the Internet on Nov. 3, 2005, Available at [[http://www.tutsystems.com/digitalheadend/solutions/index.cfm]], 1 page.

Ding, et al., "Resource-Based Striping; An Efficient Striping Strategy for Video Servers Using Heterogeneous Disk-Subsystems", Multimedia Tools and Applications, vol. 19, No. 1, Jan. 2003, pp. 29-51.

Elgammal, et al., "Non-parametric Model for Background Subtraction," IEEE ICCV99 Frame Rate Workshop, IEEE 7th International Conference on Computer Vision, Kerkyra, Greece, Sep. 1999, pp. 1-17.

Gil, et al., "Simulation of a Mobility Prediction Scheme Based on Neuro-Fuzzy Theory in Mobile Computing", Simulation, Jul. 2000, vol. 75, No. 1, pp. 6-17.

Gonzalez, et al., "Load Sharing Based on Popularity in Distributed Video on Demand Systems", Proceedings 2002 IEEE Int'l. Conf. on Multimedia and Expo, vol. 1, Aug. 2002, pp. 5-8.

Halvorsen et al., "Q-L/MRP: A Buffer Muffer Management Mechanism for QoS Support in a Multimedia DBMS", IEEE 1998, pp. 162-171.

Haritaoglu, et al., "W4S: A Real-Time System for Detecting and Tracking People in 2 1/2 D," in European Conference on Computer Vision, 1998, 16 pages.

"Infovalue Experts; Info Value Unveils Industry's First Video Multicasting Solution with Instant Replay", retrieved from the Internet on Nov. 3, 2005, Available at [[http://www.infovalue.com/links/news%20room/press%20releases/1999/Press_%20First_Multicasting_with_Instant_Replay.pdf]], 3 pages.

Kamiyama et al., "Renegotiated CBR Transmission in Interactive Video-on-Demand System", IEE 1997, pp. 12-19.

Lee, "Staggered Push-A Linearly Scalable Architecture for Push-Based Parallel Video Servers", IEEE Transactions on Multimedia, vol. 4, No. 4, Dec. 2002, pp. 423-434.

Lo, et al., "Deploy Multimedia-on-Demand Services over ADSL Networks", PCM 2002; Lecture Notes in Computer Science, vol. 2532, Dec. 2002, pp. 295-302.

Lu et al., "Experience in designing a TCP/IP based VOD system over a dedicated network", IEE 1997, pp. 262-266.

McKinley et al., "Group Communication in Multichanel Networks with Staircase Interconnection Topologies", Computer Communication Review, ACM, Sep. 1989, vol. 19, No. 4, pp. 170-181.

MediaFLO; Introducing FLO Technology:, retrieved from the Internet on Nov. 3, 2005, available at [[http://www.qualcomm.com/mediaflo/news/pdf/flo_whitepaper.pdf]], pp. 1-8.

"Multidimensional Database Technology", Computer, Dec. 2001, vol. 34, No. 12, pp. 40-46.

"Optibase MGW 2400", retreived from the Internet Nov. 3, 2005, Available at [[http://www.epecomgraphics.com/optibase_mgw2400_features.html]], 2 pages.

Petit et al., "Bandwidth Resource Optimization in Video-On-Demand Network Architectures", IEEE 1994, pp. 91-97.

"QuickTime Streaming your Media in Real Time", retrieved from the Internet on Nov. 3, 2005, Accessible at [[http://www.apple.com.tw/quicktime/technologies/streaming/]], 3 pages.

Song, et al., "Replica Striping for Multi-Resolution Video Servers", IDMS/PROMS 2002: Lecture Notes in Computer Science, vol. 2515, No. 2002, pp. 300-312.

State et al.,"Active Network Based Management for QoS Assured Multicast Delivered Media", Joint 4th IEEE Int'l Conf. on ATM and High Speed Intelligent Internet Symposium, Apr. 2001, pp. 123-127.

Tsai, R., "An Efficient and Accurate Camera Calibration Technique for 3d Machine Vision," Proceedings of the Computer Vision and Pattern Recognition, 1986, pp. 364-374.

Turk, et al., "Face Recognition Using Eigenfaces," CVPR, 1991. pp. 586-591.

Wolfson, et al., "Modeling Moving Objects for Location Based Services", Lectures Notes in Computer Science, 2002, vol. 2538, pp. 46-58.

Wu et al., "Scalable Video Coding and Transport over Broad-Band Wireless Networks", Proceedings of the IEEE, Jan. 2001, vol. 89, No. 1, pp. 6-20.

Zhang, et al., "Data Modeling of Moving Objects with GPS/GIS in Web Environment", International Conference on Communications, Circuits and Systems and West Sino Exposition Proceedings, 2002, vol. 2 pp. 1581-1585.

Zhang, et al., "The Cost Model of Moving Objects Communication with GPS", International Conference on Communications, Circuits and Systems and West Sino Exposition Proceedings, 2002, vol. 2, pp. 1576-1580.

Zhou et al., "On-line Scene Change Detection of Multicast (MBone) Video", Proceedings of the SPIE—The International Society for Optical Engineering, Nov. 1998, vol. 3527, pp. 271-282.

* cited by examiner

Fig. 1 (background)

Fig. 2 (background)

FAST START-UP FOR DIGITAL VIDEO STREAMS

RELATED APPLICATIONS

This is a continuation of and claims priority to U.S. patent application Ser. No. 10/460,949, filed Jun. 13, 2003, which is incorporated herein by reference.

BACKGROUND

With advent of digital video streaming technology (such as video-on-demand (VOD) systems), users are able to see and hear digital videos, more or less, as the data is being received from a video server.

When video is streamed, the incoming video stream is typically buffered on the user's receiving device (e.g., computer or set-top box) while data is downloaded into it. At some defined point (generally, when the buffer is full), the video contents are presented to the user. As the video content plays, the receiving device empties the data stored in the buffer. However, while the receiving device is playing the stored video, more data is being downloaded to re-fill the buffer. As long as the data can be downloaded at least as fast as it is being played back, the file will play smoothly.

MPEG

The predominant digital video compression and transmission formats are from a family called MPEG (Moving Picture Experts Group). It is the name of family of standards used for coding audio-visual information (e.g., movies, video, music, and such) in a digital compressed format.

For the convenience of explanation of video streaming, the MPEG-family video stream is generally discussed and described herein. However, those who are skilled in the art understand and appreciate that other such digital video compression and transmission formats exist and may be used.

Of course, there are other digital video compression and transmission formats, such as the H.264 codec. Those of ordinary skill in the art will understand how the concepts discussed herein with relationship to MPEG apply to other formats.

GOP and Frames

A MPEG video stream is typically defined by a series of segments called Groups of Pictures (GOP). Typically, a GOP consists of a set of pictures intended to be displayed in sequence over a short duration (e.g., ½ second) when displayed at their intended speed.

A GOP typically includes three types of frames:
an intra frame (I-frame);
predictive frames (P-frames); and
bi-directionally predictive frames (B-frames).

There is no specific limit to the number of frames which may be in a GOP, nor is there a requirement for an equal number of pictures in all GOPs in a video sequence.

The I-frame is an encoded still image. It is not dependent upon any other frame that the decoder has already received. Each GOP typically has only one I-frame. It is sometimes called a random access point (or simply an "access point") since it is an entry point for accessing its associated GOP.

From the point of view of a video-stream decoder, the P-frames are predicted from the most recently reconstructed I- or P-frame. A P-frame (such as frame 120p) requires data from a previously decompressed anchor frames (e.g., I-frames or P-frames) to enable its decompression.

Switching to the point of view of video stream encoder and transmitter, the B-frames are predicted from the closest two I- or P-frames—one frame in the past and one frame in the future. A B-frame (such as frame 132p) requires data from both preceding and succeeding anchor frames (e.g., I-frames or P-frames) to decode its image. It is bi-directionally dependent.

Of course, other digital video compression and transmission formats (such as H.264 codec) may employ other labels, some different types, and different relationships between frames. For example, in H.264, the frame types, frame dependence relationships, and frame ordering are much more decoupled than they are in MPEG. In H.264, the I-frames are independently decodable and are random access points. Also, frames have defined presentation order (like MPEG does). However, the other frames relate differently than do the MPEG P-frames and B-frames.

So, those of ordinary skill in the art will understand how the concepts discussed herein with relationship to MPEG apply to other formats.

Transmission and Presentation Timelines

FIG. 1 illustrates two manifestations of the same MPEG video stream. The first is the transmission timeline 100t and the other is the presentation timeline 100p.

The transmission timeline 100t illustrates a video stream from the perspective of its transmission by a video-stream encoder and transmitter. Alternatively, it may be viewed from the perspective of the receiver of the transmission of the video stream.

As shown in FIG. 1, the I-frames (e.g., 110t and 150t) are typically temporally longer than the other frames in the transmission timeline. Since it doesn't utilize data from any other frame, it contains all of the data necessary to produce one complete image for presentation. Consequently, an I-frame includes more data than any of the other frames. Since the I-frame has more data than others, it follows that it typically requires greater time for transmission (and, of course, reception) than the other frame types.

FIG. 1 also shows P-frames (such as 120t) and B-frames (such as 130t and 132t) of the transmission timeline 100t. Relative to the B-frames, the P-frames are temporally longer in the transmission timeline because they typically include more data than the B-frames. However, P-frames are temporally shorter than I-frames because they include less data than I-frames. Since the B-frames rely on data from at least two other frames, they typically do not need as much data of their own to decode their image as do P-frames (which rely on one other frame).

FIG. 1 also illustrates the presentation timeline 100p of the video stream from the perspective of its presentation by the video decoder and presenter. In contrast to their transmission duration, the presentation duration of each frame—regardless of type—is exactly the same. In other words, it displays at a fixed frequency.

The incoming frames of the video stream are decoded, buffered, and then presented at a fixed frequency (e.g., 24 frames per second (fps)) to produce a relatively smooth motion picture presentation to the user. In MPEG 2 used to convey NTSC video, the field rate is fixed, and each MPEG 2 picture may produce 1, 2, or 3 fields. Field pictures are required to produce 1 field, and frame pictures may produce 2 or 3 fields. Thus, the frame picture presentation rate may not be fixed, but it is not dictated by the transmission rate of the frame pictures.

FIG. 1 also illustrates a typical decoded GOP 105 of MPEG in its presentation timeline. This GOP example includes an I-frame 110p; six P-frames (e.g., 120p); and 14 B-frames (e.g., 130p and 132p). Typically, each GOP includes a series of consecutively presented decoded frames that begin with an I-frame (such as frame 110p).

Order of Transmission and Presentation

As shown in FIG. 1, the order in which the frames are presented typically does not directly match the order in which the frames are transmitted. The arrows shown in FIG. 1 between the frames of the transmission timeline 100t and the presentation timeline 100p illustrate a typical way that frames are reordered between reception and presentation. The tail of each arrow has a bullet (i.e., circle) anchor at the end of a transmitted frame. The head of each arrow has an arrowhead pointing to its corresponding presentation frame.

For example, the transmission I-frame 110t corresponds to the presentation I-frame 110p. In reality these are the same frames, but their timeline representations indicate their different manifestations.

Returning to the explanation of this example, the transmission P-frame 120t corresponds to the presentation P-frame 120p. The transmission B-frames 130t and 132t corresponds to the presentation B-frames 130p and 132p. As shown in FIG. 1, these B-frames 130t and 132t are encoded, transmitted, received, and decoded after their P-frame 120t in the transmission timeline 100t, but their corresponding presentation B-frames 130p and 132p are presented before their P-frame 120p in the presentation timeline 100t. Note that the encoder typically receives the frames in non-compressed form in the same order that the frames are eventually displayed, and the encoder typically performs the frame re-ordering before compressing the frames.

Furthermore, the next GOP to be transmitted starts with I-frame 150t, but two B-frames 134t and 136t typically come along after this new GOP has begun. As illustrated in FIG. 1, the straggling B-frames 134p and 136p are presented in sequence and before the presentation of the I-frame 150p of the new GOP.

GOP Presentation Delay

FIG. 1 shows that the I-frame 110t of an example GOP is first received beginning at point $T_1$ in time; however, it is not first presented until point $T_2$. The time gap between the two points is called herein the "GOP presentation delay" and is labeled 170 in FIG. 1. It represents the delay from when the receiver first begins receiving the first frame of a GOP (which is typically the I-frame) until the device first presents the first frame of the GOP.

There are many reasons for this delay. Some are a natural consequence of the video streaming technology and others are imposed into the process to address known technical issues. Some of reasons for the GOP presentation delay include:

contrast between the time required to receive a frame transmission and the time required to display a frame;

the time required to decode a frame (especially considering inter-frame dependencies for decoding); and built-in delay to facilitate smooth presentation of frames without needed to wait for frame transmission or decoding.

The details of these reasons and the knowledge of other reasons are known to those of ordinary skill in the art.

Video-Stream Presentation Start-up Delay

To tune channels in a video-streaming environment (such as digital cable), a receiver receives a video stream and waits for an access point into the stream. A channel change cannot occur until an access point is received. From the perspective of the user, this can lead to lengthy channel change times.

FIG. 2 illustrates an example of a video-stream presentation start-up delay at 280. The start-up delay is the effective delay experienced by a user. It includes a delay between when a particular video stream is requested and the actual presentation of the first frame of a GOP from the particular video stream. As shown in FIG. 2, the start-up delay 280 includes the GOP presentation delay 270 (discussed above).

Referring to FIG. 2, this example is explained. A GOP, starting with I-frame 210t, is being transmitted. This is shown in the transmission timeline 200t. The receiver tunes into this video stream at request point R. This selection is illustrated as a user selecting a video-stream channel using a remote control 260.

Again, this is an example illustration for explanatory purpose. This point R could be at any moment in time after the beginning (i.e., after the beginning of its I-frame 210t) of a GOP.

The receiver must wait for a random access point (or simply "access point") in order to access the video stream. In this example, each GOP has one access point. An I-frame is an example of a typical access point. Therefore, each GOP has one I-frame. So, the receiver must wait for the next I-frame (at the beginning of the next GOP) before it can access the video-stream transmission as shown by transmission timeline 200t.

Once the receiver has an I-frame in its buffer, it may refer back to it for dependency decoding of P- and B-frames. Consequently, a conventional system must wait for an access point before it can start buffering frames (that are useful).

In FIG. 2, the receiver starts buffering the next GOP at point $M_1$ with I-frame 250t. Thus, the first frame that may be eventually presented to the user is I-frame 250t, because it is the first access point in the stream after the point at which the receiver joined the stream. Because of the GOP presentation delay (discussed above), it actually starts presenting the GOP (with I-frame 250p of presentation timeline 200p) at point $M_2$—which is also the presentation start-up point S of the start-up delay 280.

As demonstrated by the screens 262-266, the start-up delay is the effective delay experienced by a user. The user selects a video-stream channel at request point R (using, for example, a remote 260) and sees a blank screen, as shown by screen 262. Of course, there may be information presented here (such as electronic programming information), but since it is not yet the desired video-stream content it is effectively blank.

Screen 264 shows that screen remains blank even after the next GOP is currently being received. Screen 266 shows that the first image of frame 250p is finally presented to the user.

The average length of this start-up delay is directly proportional to the average GOP length. Some video-stream providers employ relatively long average GOP lengths. For these instances, this delay is even more acute because the user is waiting longer for the next GOP to come round after she has changed channels.

It short, this start-up delay is very annoying to the typical users and tries their patience.

SUMMARY

Described herein is a technology facilitating the presentation of digital video streams. An implementation, described herein, reduces the effective start-up delay in the presentation of the first frames of the video content that occurs when a system tunes into a video stream.

This summary itself is not intended to limit the scope of this patent. Moreover, the title of this patent is not intended to limit the scope of this patent. For a better understanding of the present invention, please see the following detailed description and appending claims, taken in conjunction with the accompanying drawings. The scope of the present invention is pointed out in the appending claims.

BRIEF DESCRIPTION OF THE DRAWINGS

The same numbers are used throughout the drawings to reference like elements and features.

DETAILED DESCRIPTION

In the following description, for purposes of explanation, specific numbers, materials and configurations are set forth in order to provide a thorough understanding of the present invention. However, it will be apparent to one skilled in the art that the present invention may be practiced without the specific exemplary details. In other instances, well-known features are omitted or simplified to clarify the description of the exemplary implementations of the present invention, and thereby, to better explain the present invention. Furthermore, for ease of understanding, certain method steps are delineated as separate steps; however, these separately delineated steps should not be construed as necessarily order dependent in their performance.

The following description sets forth one or more exemplary implementations of a Fast Start-up for Digital Video Streams that incorporate elements recited in the appended claims. These implementations are described with specificity in order to meet statutory written description, enablement, and best-mode requirements. However, the description itself is not intended to limit the scope of this patent.

The inventors intend these exemplary implementations to be examples. The inventors do not intend these exemplary implementations to limit the scope of the claimed present invention; rather, the inventors have contemplated that the claimed present invention might also be embodied and implemented in other ways, in conjunction with other present or future technologies.

An example of an embodiment of a Fast Start-up for Digital Video Streams may be referred to as an "exemplary fast start-up system."

For the convenience of explanation, digital video streams are discussed and described herein in terms of the MPEG-family standard format. However, those who are skilled in the art understand and appreciate that other such digital video compression and transmission formats exist.

Introduction

Figure 7:
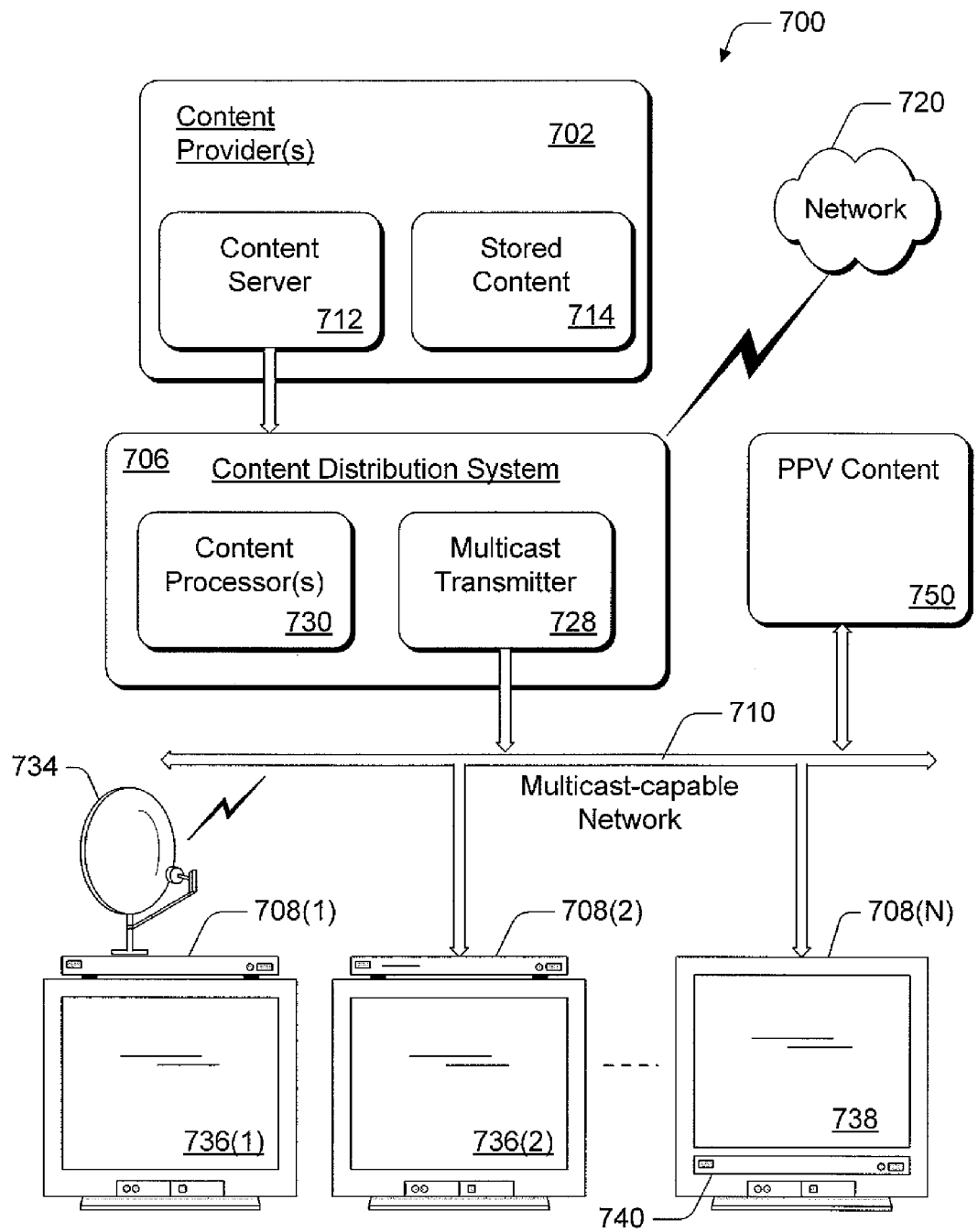
FIG. 7 illustrates exemplary environment in which an implementation described herein may be employed.

The one or more exemplary implementations, described herein, of the present claimed invention may be implemented (in whole or in part) by a presentation device 708 (of FIGS. 7-9) and/or as part of a computing environment like that shown in FIG. 7.

To tune channels in a digital video multicast (e.g., IP multicast) environment, a receiver receives a multicast video data stream and waits for an access point into the stream. This is sometimes called an access point. A channel change cannot occur until an access point is received. Thus may lead to lengthy channel change times.

A multicast environment is an example of one type of environment that employs video streaming. Such an environment may utilize Internet Protocol multicasting (i.e., IP multicasting). Those of ordinary skill in the art are familiar with multicast and its use in a multicast environment.

In many IP multicast scenarios, there is a limited bit-rate available to the client device (i.e., a receiver). The bit-rate used to the client device typically depends on which IP multicasts the client is currently listening to among all available IP multicasts.

Because the total number of ongoing IP multicasts is not limited by the available bit-rate to any particular client, the exemplary fast start-up system is particularly applicable to such a scenario. One may multicast multiple join-in streams (e.g., alternative transmissions 402-207) and a main stream at all times. Furthermore, individual client device may determine for themselves which stream to be listening to at any given point. Also, the bit-rate of the main stream may be as high as the connection to the client device can support—so, a relatively high an apparent steady-state video quality may be achieved.

Figure 1:
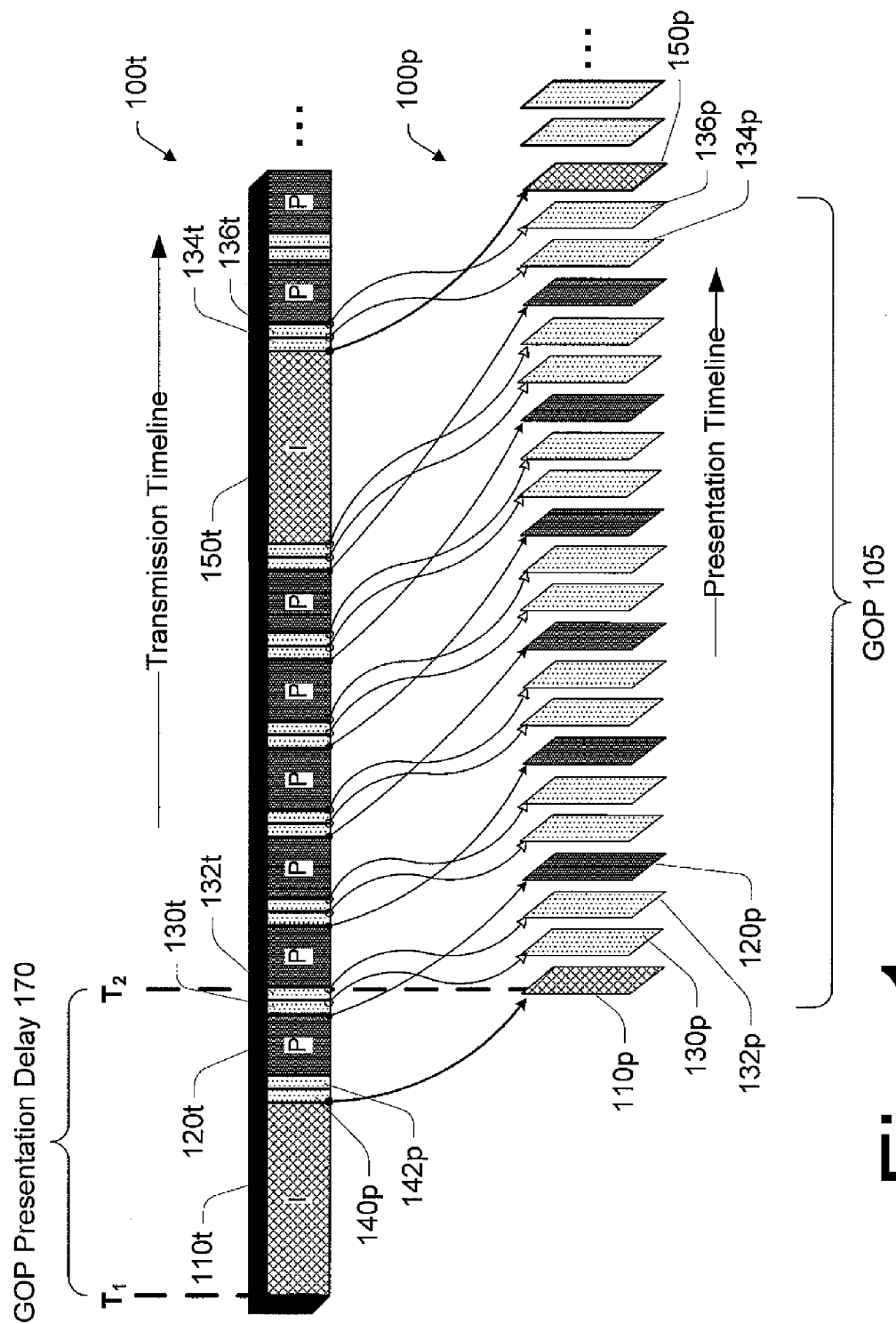
FIG. 1 is diagram illustrating a typical video stream transmission timeline and its corresponding presentation timeline.
Figure 2:
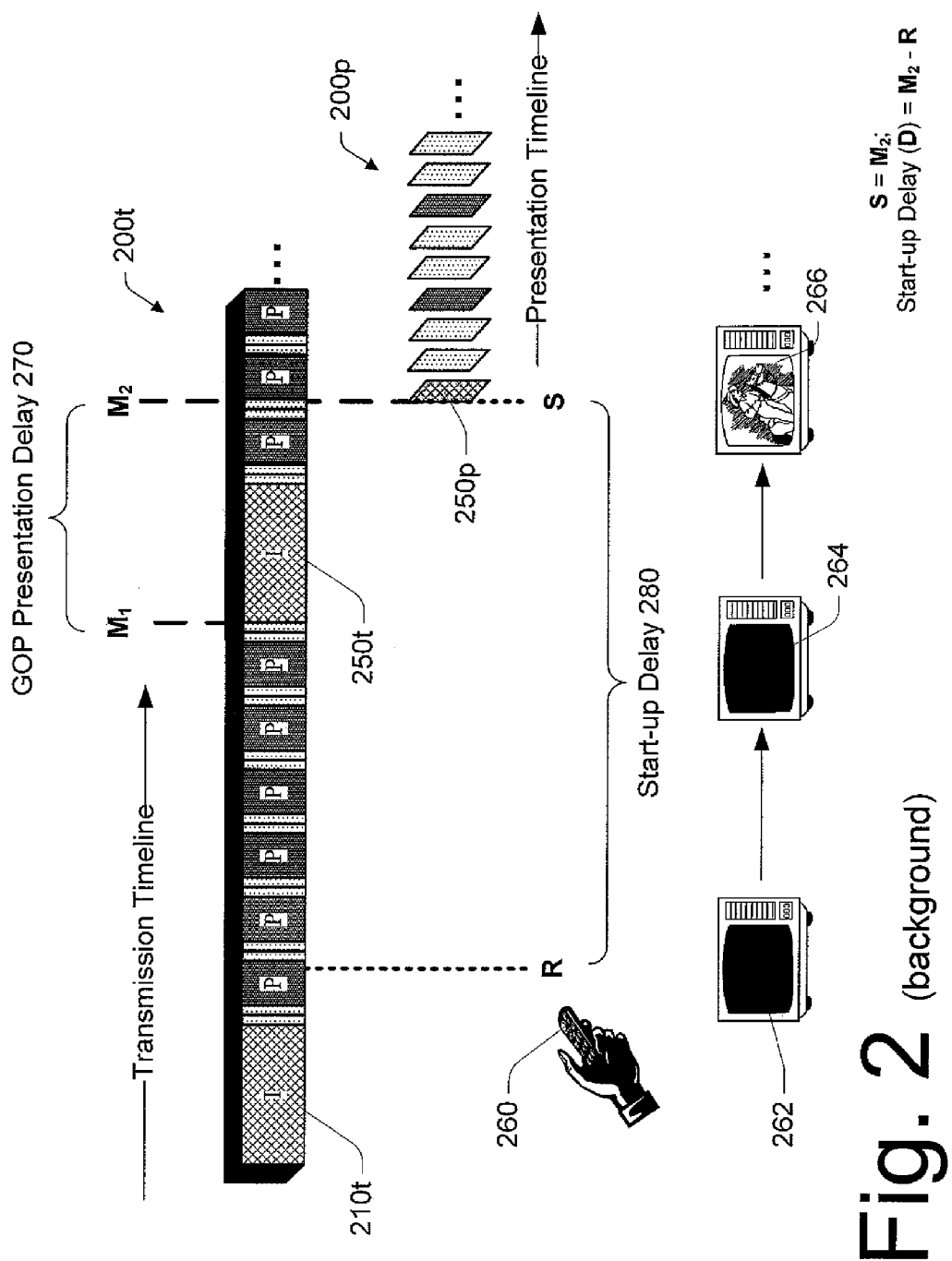
FIG. 2 is diagram illustrating the presentation start-up delay using a typical video stream transmission timeline and its corresponding presentation timeline.
Figure 3:
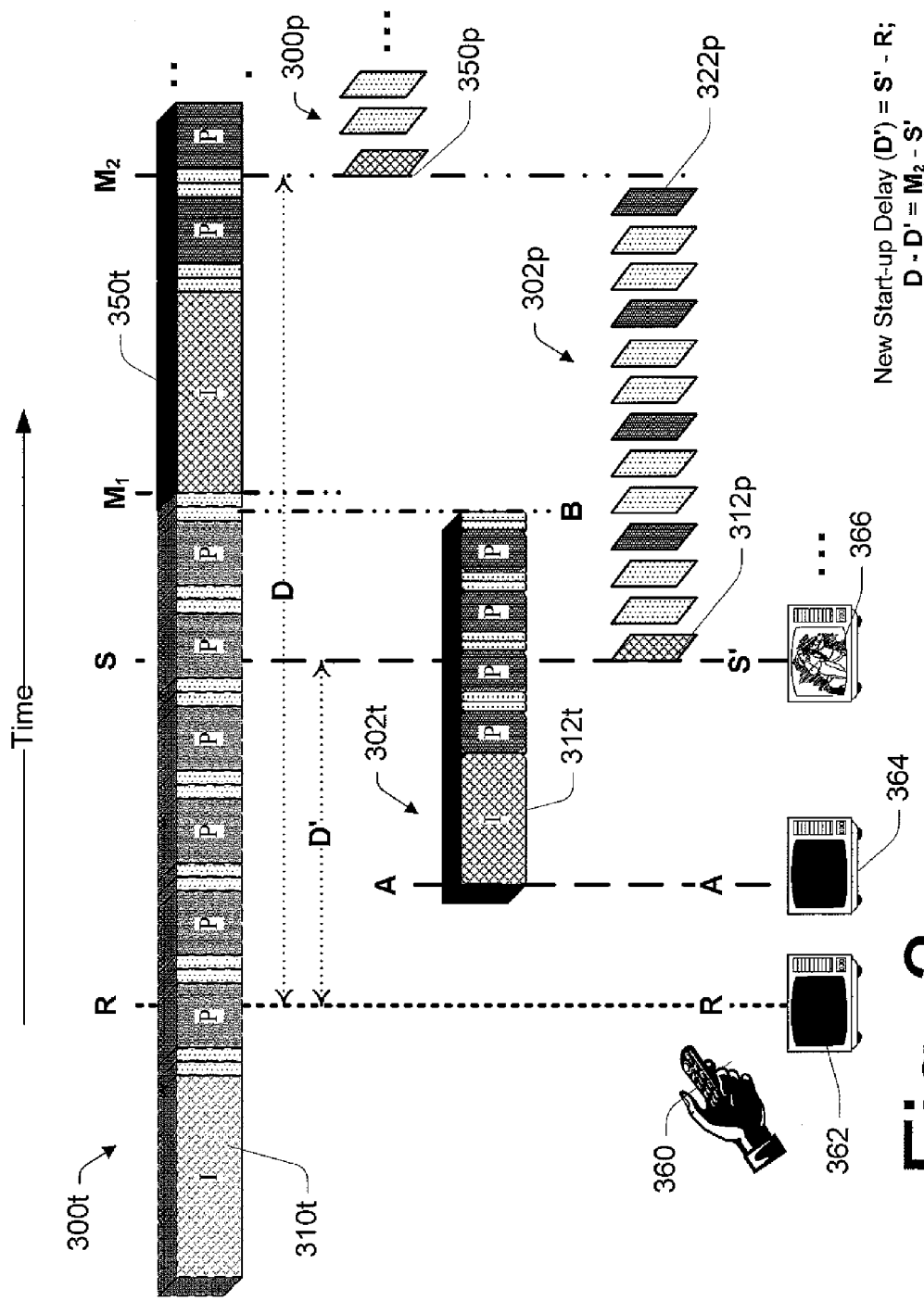
FIG. 3 is diagram illustrating the new presentation start-up delay in accordance wit an implementation, described herein, that employs a single alternative video-stream.

As shown in FIG. 3, the exemplary fast start-up system employs a main multicast video stream transmission 300*t* and one or more alternative multicast lead-in video stream transmissions (such as transmission 302*t*) to achieve a faster tuning time. These alternative streams include the same original content as the main stream, but they may have a lower bit-rate than the main stream.

The alternative streams may be low bitrate so that they may be transmitted in less time than is required to transmit the main stream. This is graphically illustrated by alternative video-stream transmission 302*t* being shorter than the corresponding frames in the main video-stream transmission 300*t*. Herein, the concept of "low bitrate" is in terms of number of bits per picture (i.e., frame). These may be a normal bitrate in terms of the number of bits per second.

With the exemplary fast start-up system, the video stream content is presented more quickly (than conventional approaches) in response to a tuning command—even if the initial picture is of lesser quality.

While much of the discussion of the exemplary fast start-up system is framed within terms of the MPEG family of digital video compression and transmission formats, those of ordinary skill in the art will understand how the concepts discussed herein with relationship to MPEG apply to other formats, such as H.264.

Exemplary Fast Start-up System with One Alternative Stream

FIG. 3 illustrates the exemplary operation of the exemplary fast start-up system with only one alternative video-stream. FIG. 3 shows the main multicast video stream transmission 300*t* and the alternative multicast lead-in video stream transmission 302t. Although this discussion refers to the use of only one alternative stream, the bulk of the concepts illustrated in this example apply the use of multiple alternative video-streams.

FIG. 3 also illustrates how this operation reduces the apparent video-stream presentation start-up delay—which is the effective delay experienced by the user. This start-up delay is the delay between the time a particular video stream is requested and the actual presentation of the first frame of a GOP.

Referring to FIG. 3, this example is explained. A GOP starting with I-frame 310t is transmitted in the main stream 300t. The receiver tunes into this video stream at request point R. This selection is illustrated as a user selecting a video-stream channel using a remote control 360. (However, in a multicast environment this stream 300t is requested, but since the receiver is not yet tuned in, the stream may not actually be transmitted to the receiver until some point after R.)

Again, this is an example illustration for explanatory purpose. This point R could be at any moment in time within a GOP after its beginning (i.e., after the beginning of its I-frame 310t).

The receiver typically waits for an access point in order to access a video stream. (In this example, each GOP is assumed to have one access point.) An I-frame is an example of a typical access point. So, the receiver must wait for the next I-frame (at the beginning of the next GOP transmission) before it can access a video-stream transmission and present the video.

With conventional approaches, the user would start seeing the video presentation (as shown in presentation timeline 300p) upon the presentation of the first I-frame 350p at point $M_2$. Therefore, the conventional presentation start-up delay (D) would be the difference between the request point (R) and point $M_2$. Written as an equation that is $$D = M_2 - R \qquad [1]$$

Conventional Presentation Start-up Delay

However, instead of waiting for the next access point in the main stream transmission 300t, the exemplary fast start-up system tunes into the alternative video-stream transmission 302t. It starts receiving this GOP transmission at point A. The access point of alternative transmission 302t is I-frame 312t; therefore, it can begin presenting the alternative presentation timeline 302p with presentation I-frame 312p at point S'.

While alternative video-stream is presented (as shown in presentation timeline 302p), the exemplary fast start-up system requests that the multicast router switch the receiver to the main stream multicast transmission 300t at the next access point (e.g., I-frame 350t) of the main stream.

While alternative video-stream is presented (as shown in presentation timeline 302p), the exemplary fast start-up system starts receiving main video-stream transmission 300t starting with the first frame (e.g., I-frame 350t) of the next GOP of the main stream. In FIG. 3, the first frame (e.g., I-frame 350t) of the next GOP starts at point $M_1$. Point B on the timeline represents the end of the reception of the last frame of the alternative stream transmission 302t.

The switch-over from the alternative stream transmission 302t back to the main stream 300t occurs during or around the gap between points B and $M_1$ in FIG. 3. An exaggerated and visible gap between these points is shown in FIG. 3 to illustrate that there is a clear opportunity for the exemplary fast start-up system to join the main stream. In reality, points B and $M_1$ may occur very nearly concurrently and may indeed be concurrent. It is possible in some embodiments to have an small overlap so that point B occurs shortly after point $M_1$.

At point $M_2$, the exemplary fast start-up system starts presenting main video-stream presentation 300p starting with the first frame (e.g., I-frame 350p) of the next GOP of the main stream. This starts immediately after (or very nearly so) the presentation of the last frame (e.g., frame 322p) of the alternative stream presentation 302p. This presentation switch-over point is designated in FIG. 3 at point $M_2$.

To accomplish switch-over, it may be desirable for the main stream be tagged for splicing. Alternatively, the access point locations within the main stream may be conveyed to the multicast router via some other mechanism. Furthermore, it may be desirable for the router have an extension to normal IP multicast so that it starts delivering the main stream multicast transmission when the next access point in the main stream multicast arrives.

Although not necessarily required, it is desirable for the presentation of the alternative stream 302p to be timed so that the last frame presented (e.g., frame 322p) is presented immediately before the presentation of the first frame (e.g., frame 350p) of the main stream presentation 300p. Doing so enhances the smooth presentation of the video content—in particular, it smoothes the presentation of the switch-over from the alternative to the main stream presentations at point $M_2$.

As demonstrated by the screens 362-366, the start-up delay is the effective delay experienced by a user. The user selects a video-stream channel at request point R (using, for example, a remote 360) and sees a blank screen, as shown by screen 362. Of course, there may be information presented here (such as electronic programming information), but since it is not yet the desired video-stream content it is effectively blank.

Screen 364 shows that screen remains blank even as the access point of the alternative stream 302t is being transmitted and received. However, screen 366 shows that the first image of frame 312p is presented to the user.

With the exemplary fast start-up system (as shown in FIG. 3), the user first experiences the presentation of the video content (as shown in alternative presentation timeline 302p) upon the presentation of the first I-frame 312p at point S'. Therefore, the new presentation start-up delay (D') would be the difference between the request point (R) and presentation of the alternative stream at point S'. Expressed as an equation, that is $$D' = S' - R \qquad [2]$$

New Presentation Start-up Delay

The time-savings effected by the exemplary fast start-up system is the difference between the D' and D. Using equations 1 and 2, that time-savings may be expressed as this equation:

$$D - D' = M_2 - S' \qquad [3]$$

Time-savings

With the exemplary fast start-up system, the user experience is improved because the new start-up delay (D') is less than the conventional stat-up delay (D) (i.e., D'<D). The exemplary fast start-up system improves the user's experience by decreasing the effective start-up delay experienced by the user when compared to the delay experienced using conventional approaches.

Exemplary Fast Start-up System with Multiple Alternative Streams

To further minimize the start-up delay, the exemplary fast start-up system may account for the randomness at which a user tunes into a video-stream channel by employing multiple alternative, access point phase-staggered video-stream transmissions.

Figure 4:
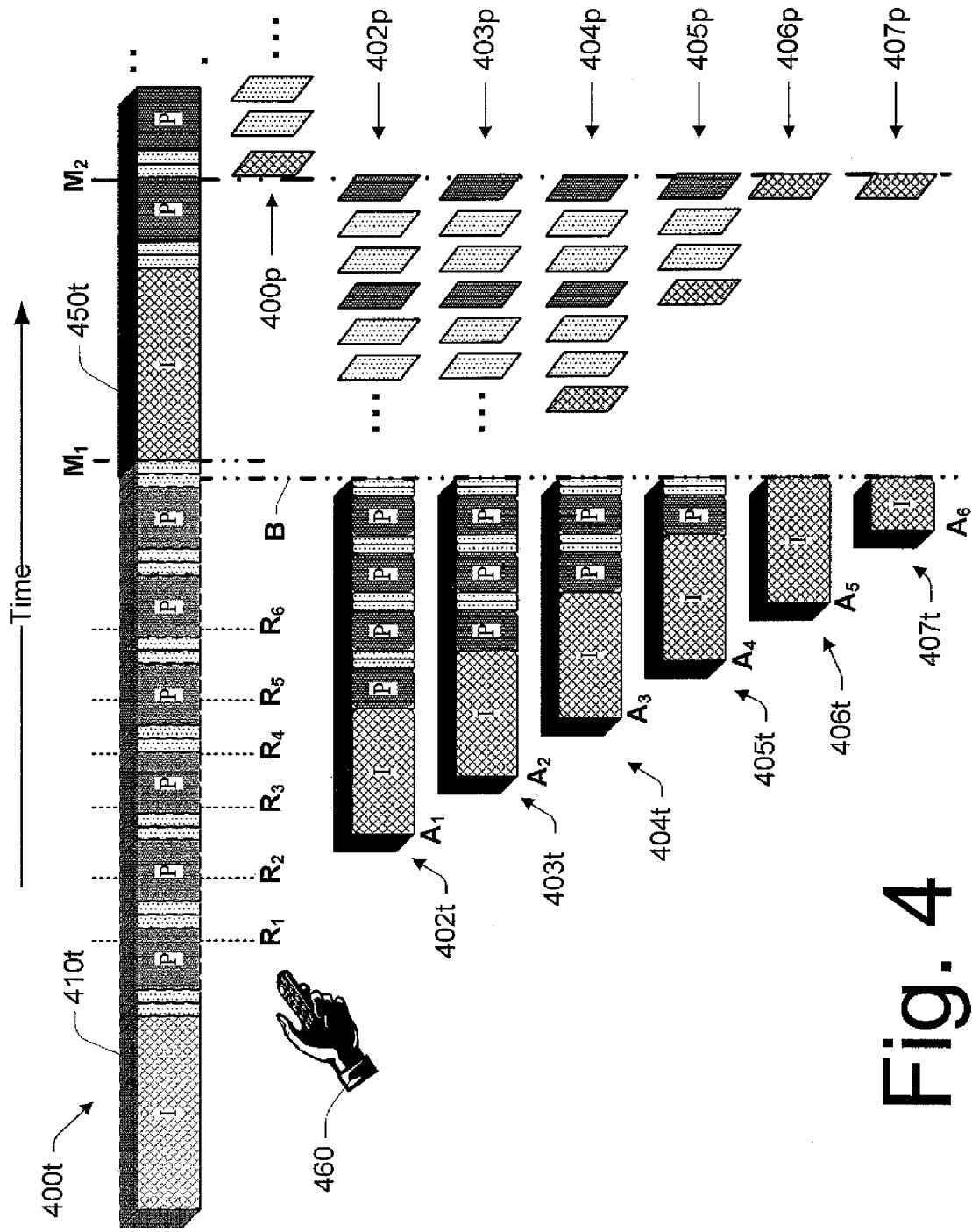
FIG. 4 is diagram illustrating the new presentation start-up delays in accordance with another implementation, described herein, that employs multiple alternative video-streams.

FIG. 4 shows the main multicast video stream transmission 400t and phase-staggered multiple alternative lead-in video-stream transmissions 402t-407t. Each alternative transmission may be sent using all of the available bandwidth—thereby minimizing transmission time for each stream. Also, the transmission schedule of the streams are phase-staggered so that the completed reception of each stream's access point is staggered. Since the access point of each of the streams illustrated in FIG. 4 is at the beginning of the transmissions, the beginning of each of the transmissions 402t-407t is staggered. This staggered start of the alternative transmissions is illustrated in FIG. 4.

Furthermore, the time range of phase-staggering of the alternative streams 402t-407t is between access points of the main stream transmission 400t. In FIG. 4, this is illustrated by the phase-staggering between I-frames 410t and 450t.

By sending multiple different streams, tuning time is improved because the receiver may select one of the lead-in streams to play. The one selected will typically be the one which will be ready to be presented the quickest after the time at which the user tunes.

These alternative transmissions need not be sent concurrently to a particular receiver within a multicast environment. Rather, each one is prepared for transmission, but a particular multicast stream is sent to a particular receiver only when requested by that receiver. FIG. 4 shows six alternative request points ($R_1$ through $R_6$) where each one corresponds to a particular alternative video-stream transmission (streams 402t-407t, respectively).

For example, when the exemplary fast start-up system wishes to tune to a channel (examples are indicated by points $R_1$ through $R_6$), it queries the multicast server (such as content server 712 of FIG. 7) in order to determine which lead-in alternative stream is the first lead-in that has not started yet, and the receiver joins that alternative multicast transmission. Then, the exemplary fast start-up system requests that the router switch the receiver back to the main stream multicast transmission 400t just before the next access point (e.g., frame 450t) of the main stream.

In one embodiment, the transmission of the group-of-pictures (GOP) of each of the multiple streams ends on or about the same point in the transmission schedule. Since the alternative stream transmission(s) serves as a "bridge" until the receiver can start receiving the next access point of the main stream 400t, all of these alternative streams (402t-408t) are shown in FIG. 4 ending at point B.

In FIG. 4, the first frame (e.g., I-frame 450t) of the next GOP starts at point $M_1$. Point B on the timeline represents the end of the reception of the last frame of each of the alternative streams (402t-408t).

The switch-over from each of the alternative streams (402t-408t) back to the main stream 400t occurs during or around the gap between points B and $M_1$ in FIG. 4. An exaggerated and visible gap between these points is shown in FIG. 4 to illustrate that there is a clear opportunity for the exemplary fast start-up system to join the main stream. In reality, points B and $M_1$ may occur very nearly concurrently and may indeed be concurrent. It is possible in some embodiments to have a small overlap so that point B occurs shortly after point $M_1$.

FIG. 4 shows the alternative video-stream presentations 402p-407p that correspond to the alterative video-stream transmissions 402p-407p, respectively. Although not necessarily required, it is desirable for the alternative video-stream presentations 402p-407p to be timed so that the last frame presented is presented immediately before the presentation of the first frame of the main stream presentation 400p. Doing so enhances the smooth presentation of the video content—in particular, it smoothes the presentation of the switch-over from the alternative to the main stream presentations at point $M_2$.

Operation of Exemplary Fast Start-up System

Figure 5:
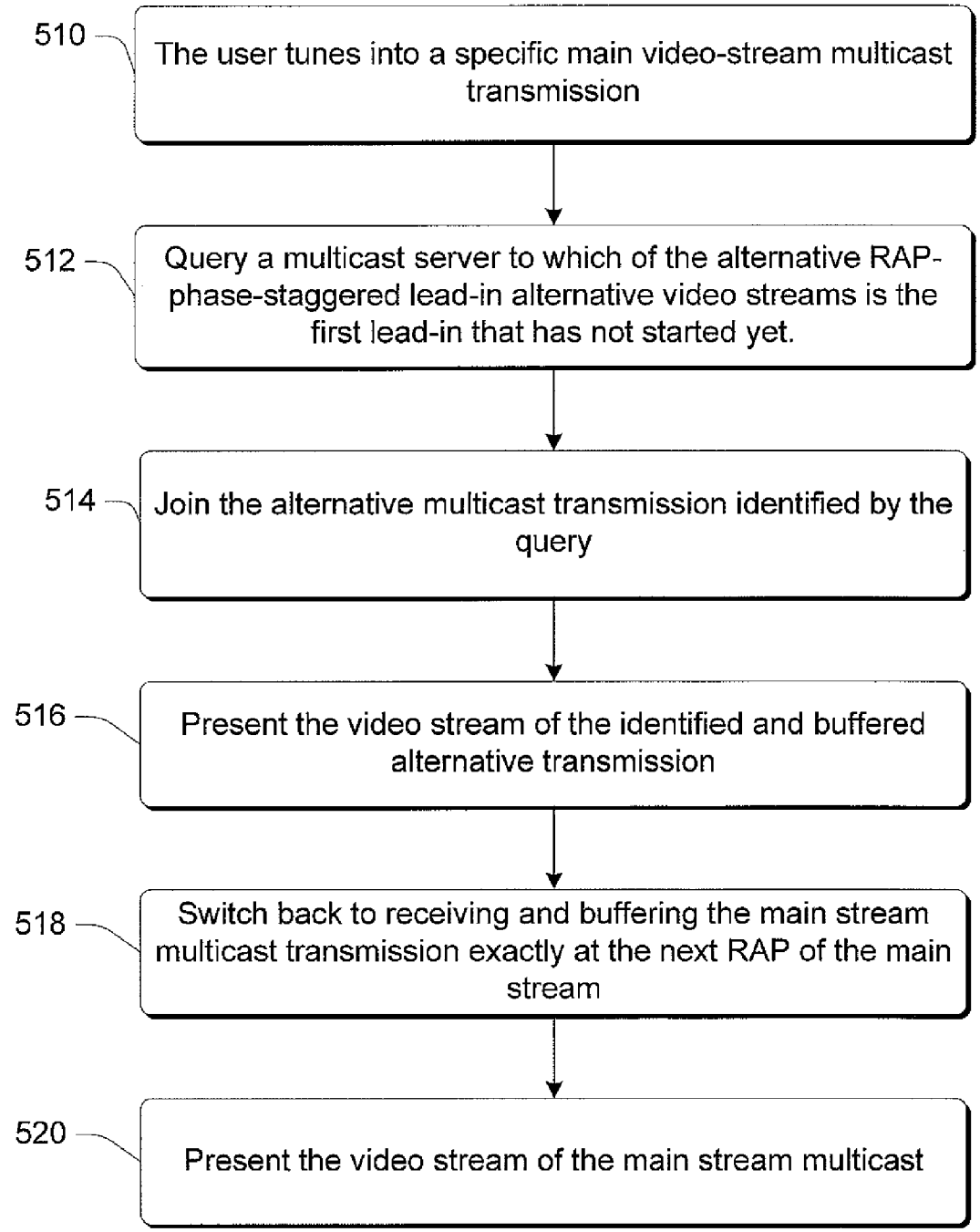
FIG. 5 is a flow diagram showing a methodological implementation described herein.

FIG. 5 shows a methodological implementation of the exemplary fast start-up system. This methodological implementation may be performed in software, hardware, or a combination thereof.

At 510 of FIG. 5, the user tunes into a specific main video-stream multicast transmission (e.g., 300t or 400t). This example point is designated at points R in FIG. 3 and $R_1$ through $R_6$ in FIG. 4.

At 512, the exemplary fast start-up system queries a multicast server (such as content server 712 of FIG. 7) in order to determine which of the alternative access point-phase-staggered lead-in alternative video streams is the first lead-in that has not started yet. Of course, if there is only one alternative transmission, this query may be viewed simply as a request.

At 514, the exemplary fast start-up system joins the alternative multicast transmission identified by the query. It receives and buffers this alternative transmission. This occurs, for example, at designated points A in FIG. 3 and $A_1$ through $A_6$ in FIG. 4.

At 516, it presents the video stream of the identified and buffered alternative transmission. This occurs, for example, at designated point S in FIG. 3.

At 518, the exemplary fast start-up system switches back to receiving and buffering the main stream multicast transmission (e.g., 300t and 400t) exactly at the next access point (e.g., frame 350t and 450t) of the main stream. It may do this by requesting that the router switch the receiver back to the main stream multicast transmission exactly at the next access point of the main stream. This occurs, for example, between or around designated points B and $M_1$ in FIGS. 3 and 4. This may also be described as occurring "on or about" such designated points.

At 520, it presents the video stream of the main stream multicast. This occurs, for example, at designated point $M_2$ in FIGS. 3 and 4.

Operation of Exemplary Fast Start-up Multicast System

Figure 6:
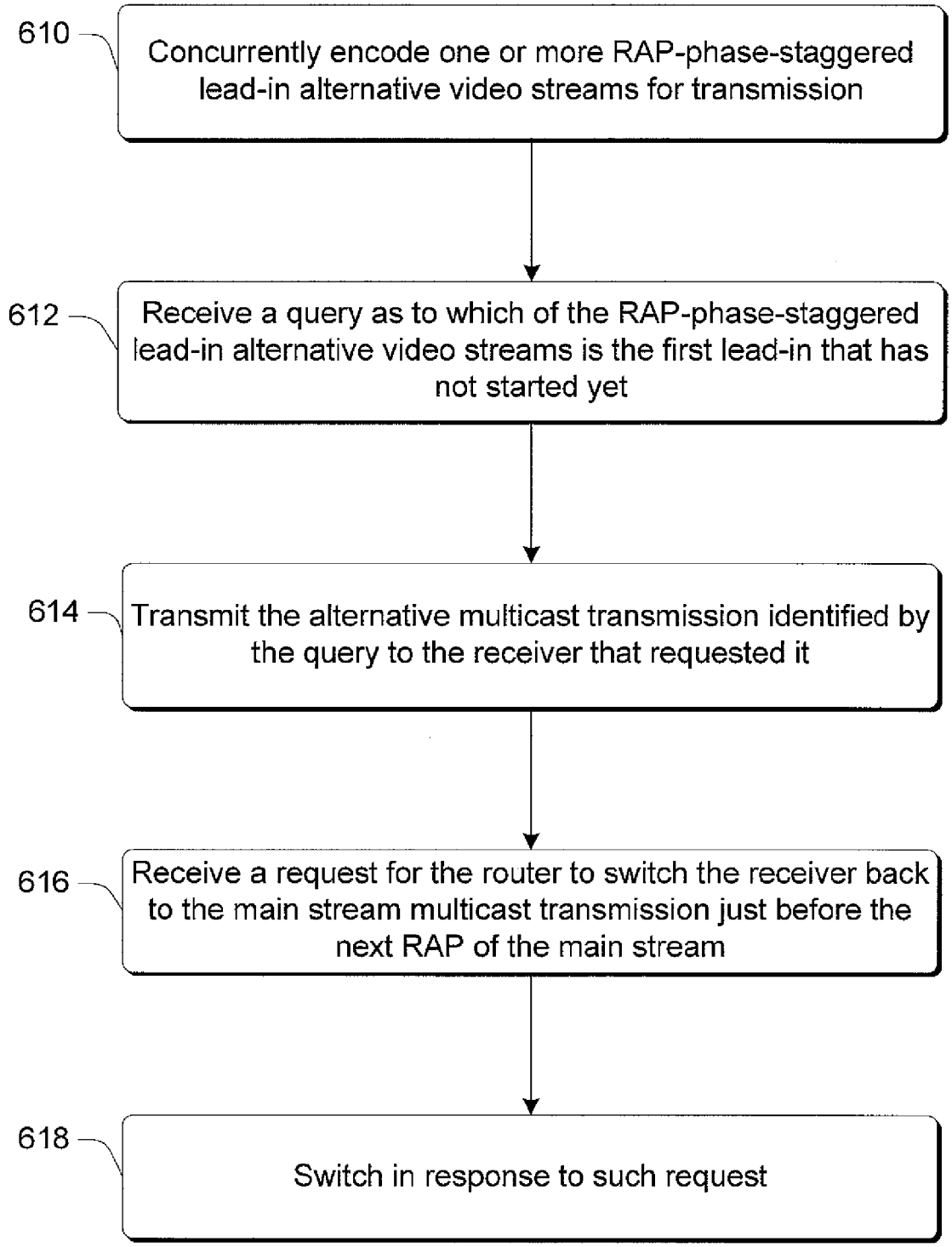
FIG. 6 is a flow diagram showing a methodological implementation described herein.

FIG. 6 shows a methodological implementation of the exemplary fast start-up multicast system, which may be embodied by a content provider 702 and/or a content distribution system 706 of FIG. 7). This methodological implementation may be performed in software, hardware, or a combination thereof.

At 610 of FIG. 6, the exemplary fast start-up multicast system concurrently encodes one or more alternative video streams for transmission. The server system encodes each alternative stream so that the access point of each is phase-staggered relative to the other streams.

Furthermore, each stream is encoded so that each ends at the same point, which is at or near when the next access point is available in the main video stream. This designated point, for example, is point $M_1$ in FIGS. 3 and 4.

At 612, the multicast system receives a query to which of the access point-phase-staggered lead-in alternative video streams is the first lead-in that has not started yet. Of course, if there is only one alternative transmission, this query may be viewed simply as a request.

At 614, it transmits the alternative multicast transmission identified by the query to the receiver that requested it.

At 616, the multicast system receives a request for the router switch the receiver back to the main stream multicast transmission just before the next access point of the main stream. At 618, it does so in response to such a request. This occurs, for example, between or around designated points B and $M_1$ in FIGS. 3 and 4. This may also be described as occurring "on or about" such designated points.

Exemplary Environment

FIGS. 7 illustrates an exemplary environment 700 in which the techniques, systems, and other aspects described herein may be implemented (partially or wholly). Exemplary environment 700 is a television entertainment system that facilitates distribution of multi-media.

The environment 700 includes one or more multimedia content providers 702, a content distribution system 706, and one or more presentation devices 708(1), 708(2), ..., 708(N) coupled to the content distribution system 706 via a multicast-capable network 710.

Multimedia content provider 702 includes a content server 712 and stored content 714, such as movies, television programs, commercials, music, and similar audio and/or video content. Content server 712 controls distribution of the stored content 714 from content provider 702 to the content distribution system 706. Additionally, content server 702 controls distribution of live content (e.g., content that was not previously stored, such as live feeds) and/or content stored at other locations to the content distribution system 706.

Content distribution system 706 may be coupled to a network 720, such as an intranet or the Internet. The content distribution system 706 includes a multicast transmitter 728, and one or more content processors 730. Multicast transmitter 728 multicasts signals across multicast-capable network 710.

Content distribution system 706 is representative of a headend service that provides multimedia content to multiple subscribers.

Multicast-capable network 710 can include a cable television network, RF, microwave, satellite, and/or data network, such as the Internet, and may also include wired or wireless media using any multicast format or multicast protocol. Additionally, multicast-capable network 710 may be any type of network, using any type of network topology and any network communication protocol, and may be represented or otherwise implemented as a combination of two or more networks.

Content processor 730 processes the content received from content provider 702 prior to transmitting the content across multicast-capable network 708. A particular content processor 730 may encode, or otherwise process, the received content into a format that is understood by the multiple presentation devices 708(1), 708(2), ..., 708(N) coupled to multicast-capable network 710.

Presentation devices 708 may be implemented in a number of ways. For example, a presentation device 708(1) receives content multicasted from a satellite-based transmitter via a satellite dish 734. Presentation device 708(1) is also referred to as a set-top box or a satellite receiving device. Presentation device 708(1) is coupled to a television 736(1) for presenting the content received by the presentation device (e.g., audio data and video data), as well as a graphical user interface. A particular presentation device 708 may be coupled to any number of televisions 736 and/or similar devices that may be implemented to display or otherwise render content. Similarly, any number of presentation devices 708 may be coupled to a single television 736.

Presentation device 708(2) is also coupled to receive content from multicast-capable network 710 and provide the received content to associated television 736(2). Presentation device 708(N) is an example of a combination television 738 and integrated set-top box 740. In this example, the various components and functionality of the set-top box are incorporated into the television, rather than using two separate devices. The set-top box incorporated into the television may receive multicast signals via a satellite dish or wireless antenna (such as dish 734) and/or via multicast-capable network 710. In alternate implementations, presentation devices 706 may receive content via the Internet or any other multicast medium.

The exemplary environment 700 also includes live or stored pay-per-view (PPV) content 742, such as PPV movie content. The stored or live content is typically multicast on a schedule. When a device joins a PPV multicast channel, the PPV content may be viewed with a presentation device 708.

Exemplary Presentation Device

Figure 8:
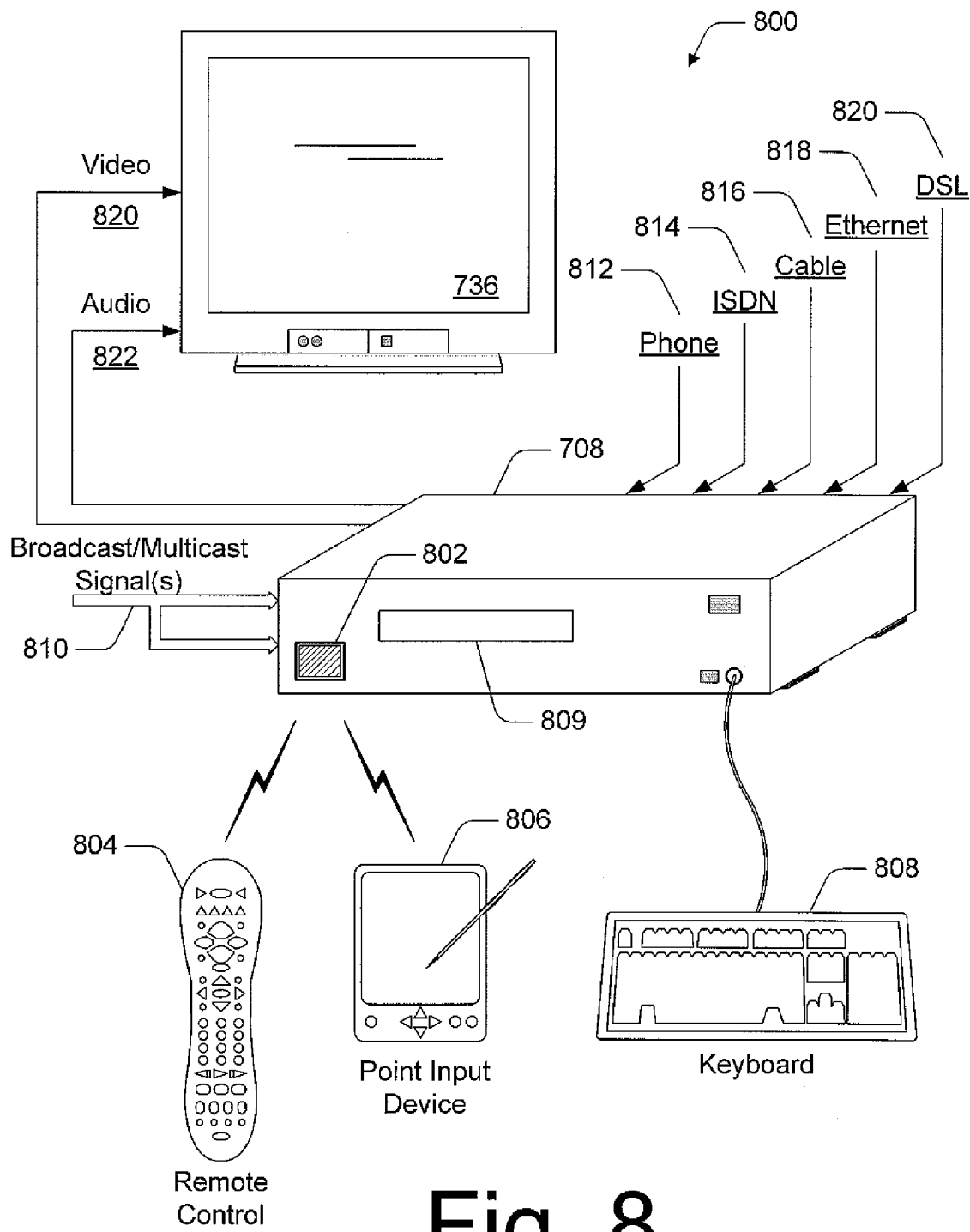
FIG. 8 illustrates of an example presentation device, a television, and various input devices that interact with the presentation device.

FIG. 8 illustrates an exemplary implementation 800 of a presentation device 708 shown as a standalone unit that connects to a television 736. Presentation device 708 may be implemented in any number of embodiments, including as a set-top box, a satellite receiver, a TV recorder with a hard disk, a game console, an information appliance, a DVD player, personal video recorder, a personal computer, a home media center, a modem, and so forth.

Presentation device 708 includes a wireless receiving port 802, such as an infrared (IR) or Bluetooth wireless port, for receiving wireless communications from a remote control device 804, a handheld input device 806, or any other wireless device, such as a wireless keyboard. Handheld input device 806 may be a personal digital assistant (PDA), handheld computer, wireless phone, or the like. Additionally, a wired keyboard 808 is coupled to communicate with the presentation device 708. In alternate embodiments, remote control device 804, handheld device 806, and/or keyboard 808 may use an RF communication link or other mode of transmission to communicate with presentation device 708.

Presentation device 708 may have a storage medium reader 809 for reading content storage media, such as DVD disks. A standalone or non-standalone presentation device 708 may include the storage medium reader 809.

Presentation device 708 may receive one or more multicast signals 810 from one or more multicast sources, such from a multicast network.

Presentation device 708 also includes hardware and/or software for providing the user with a graphical user interface by which the user can, for example, access various network services, configure the presentation device 708, and perform other functions.

Presentation device 708 may be capable of communicating with other devices via one or more connections including a conventional telephone link 812, an ISDN link 814, a cable link 816, an Ethernet link 818, a DSL link 820, and the like. Presentation device 708 may use any one or more of the various communication links 812-820 at a particular instant to communicate with any number of other devices. The multicast signals may also be received via the various communication links 812-820.

Presentation device 708 generates video signal(s) 820 and audio signal(s) 822, both of which are communicated to television 736. Alternatively, video and audio signal may be communicated to other audio/visual equipment, such as speakers, a video monitor, a home theater system, an audio system, and the like.

Although not shown in FIG. 8, presentation device 708 may include one or more lights or other indicators identifying the current status of the device. Additionally, the presentation device may include one or more control buttons, switches, or other selectable controls for controlling operation of the device.

Figure 9:
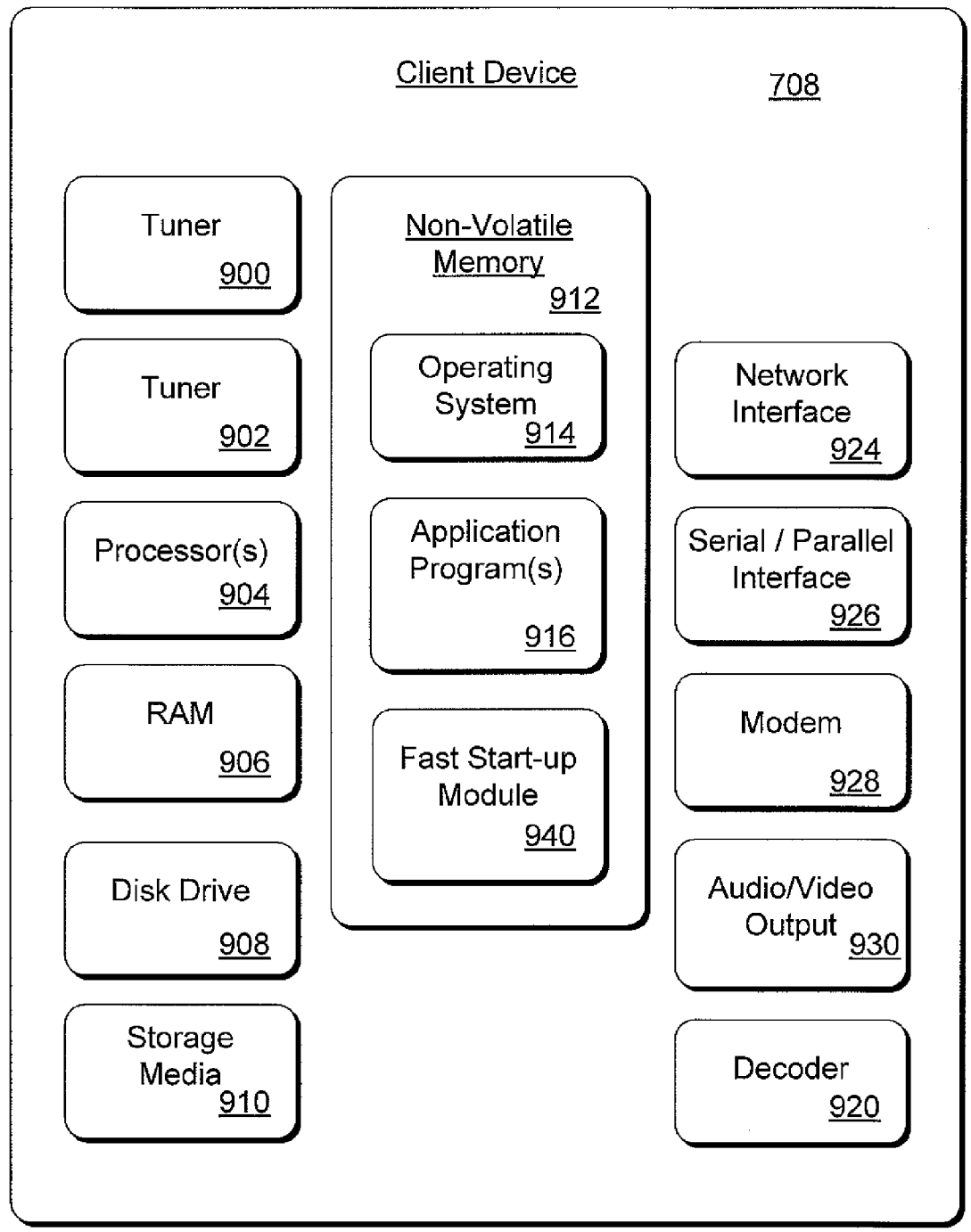
FIG. 9 is a block diagram that illustrates components of the example presentation device(s) shown in FIGS. 7 and 8.

FIG. 9 illustrates selected components of presentation device 708 shown in FIGS. 7 and 8. Presentation device 708 includes a first tuner 900 and an optional second tuner 902. The tuners 900 and 902 are representative of one or more in-band tuners that tune to various frequencies or channels to receive television signals, as well as an out-of-band tuner or receiver or network interface card that tunes to or receives the multicast communications channel over which other content may be multicast to presentation device 708.

The tuners 900 and 902 may be digital tuners, analog tuners, or any combination of analog and digital components used to get digital data into the client device 708.

Presentation device 708 also includes one or more processors 304 and one or more memory components. Examples of possible memory components include a random access memory (RAM) 906, a disk drive 908, a mass storage component 910, and a non-volatile memory 912 (e.g., ROM, Flash, EPROM, EEPROM, etc.).

Alternative implementations of presentation device 708 can include a range of processing and memory capabilities, and may include more or fewer types of memory components than those illustrated in FIG. 9.

Processor(s) 904 process various instructions to control the operation of presentation device 708 and to communicate with other electronic and computing devices. The memory components (e.g., RAM 906, disk drive 908, storage media 910, and non-volatile memory 912) store various information and/or data such as multimedia content, electronic program data, web content data, configuration information for presentation device 708, and/or graphical user interface information. The device may cache data into any one of these many memory components.

An operating system 914 and one or more application programs 916 may be stored in non-volatile memory 912 and executed on processor 904 to provide a runtime environment. A runtime environment facilitates extensibility of presentation device 708 by allowing various interfaces to be defined that, in turn, allow application programs 916 to interact with presentation device 708.

The application programs 916 that may be implemented on the presentation device 708 may include an electronic program guide (EPG), an email program to facilitate electronic mail, and so on.

Presentation device 708 can also include other components pertaining to a television entertainment system which are not illustrated in this example for simplicity purposes. For instance, presentation device 708 can include a user interface application and user interface lights, buttons, controls, etc. to facilitate viewer interaction with the device.

Network interface 924 and serial and/or parallel interface 926 allows to presentation device 708 to interact and communicate with other electronic and computing devices via various communication links. Although not shown, presentation device 708 may also include other types of data communication interfaces to communicate with other devices.

It may include a modem 928 or other communications device that facilitates communication with other electronic and computing devices via a conventional telephone line or other communications mediums.

The presentation device 708 has the ability to receive multicast digital data is and it may receive it using the tuners 900 or 902, the network interface 924, the modem 928, or other communications device.

Presentation device 708 also includes an audio/video output 930 that provides signals to a television or other device that processes and/or presents or otherwise renders the audio and video data. This output may be called the display.

Presentation device 708 also includes a fast start-up module 940 that partially or wholly implements the exemplary fast start-up system. It may be application program or a hardware component.

Although shown separately, some of the components of presentation device 708 may be implemented in an application specific integrated circuit (ASIC). Additionally, a system bus (not shown) typically connects the various components within presentation device 708.

A system bus may be implemented as one or more of any of several types of bus structures, including a memory bus or memory controller, a peripheral bus, an accelerated graphics port, or a local bus using any of a variety of bus architectures. By way of example, such architectures can include a CardBus, Personal Computer Memory Card International Association (PCMCIA), Accelerated Graphics Port (AGP), Small Computer System Interface (SCSI), Universal Serial Bus (USB), IEEE 1394, a Video Electronics Standards Association (VESA) local bus, and a Peripheral Component Interconnects (PCI) bus also known as a Mezzanine bus.

Computer-Executable Instructions

An implementation of an exemplary fast start-up system may be described in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Computer Readable Media

An implementation of an exemplary fast start-up system may be stored on or transmitted across some form of computer readable media. Computer readable media may be any available media that may be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

CONCLUSION

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A computer storage medium having computer-executable instructions that, when executed by a computer, perform a method comprising:
   selecting a lead-in video stream, wherein the lead-in stream corresponds to a portion of a particular main video-stream transmission, the portion of the particular main video-stream transmission being encoded at a first bit-rate, the selected lead-in video-stream transmission being encoded at a second bit-rate, wherein the second bit-rate represents a lower number of bits per frame than a number of bits per frame represented by the first bit-rate, wherein the lead-in video stream is scheduled for transmission during the scheduled transmission of the portion of the particular main video-stream transmission, wherein the second bit-rate is determined by a function based at least in part on a request time and a next access point transmission time, the request time corresponding to a request to receive the particular main video-stream transmission, the next access point transmission time corresponding to transmission of a next access point in the particular main video-stream following the request time, wherein if a first difference between a first request time and the next access point transmission time is less than a second difference between a second request time and the next access point transmission time, a first calculated bit-rate associated with the first difference is smaller than a second calculated bit-rate associated with the second difference;
   receiving the selected lead-in video-stream transmission;
   presenting content of the selected lead-in video stream transmission;
   switching reception from the lead-in to the main video-stream transmission;
   switching presentation from the content of the lead-in to the content of the main video-stream transmission.

2. A medium as recited in claim 1, wherein the selected lead-in video stream of the selecting is chosen from one of multiple lead-in video streams.

3. A medium as recited in claim 1, wherein the switching occurs on or about the occurrence of an access point transmitted in the main video-stream transmission.

4. A medium as recited in claim 1, wherein the switching occurs just before the occurrence of an access point transmitted in the main video-stream transmission.

5. A medium as recited in claim 1, wherein the access point of each of the multiple lead-in video-stream transmissions are scheduled for phase-staggered transmission relative to each other.

6. A medium as recited in claim 1, wherein the video-stream transmissions are multicast.

7. A medium as recited in claim 1, wherein an available access point is an anchor frame.

8. A computer storage medium having computer-executable instructions that, when executed by a computer, perform a method comprising:
   choosing a particular main video-stream transmission for reception and presentation;
   before the transmission of the next access point transmitted in the main video-stream transmission, temporarily receiving a lead-in video stream that corresponds to the particular main video-stream transmission, the particular main video-stream transmission being encoded at a first bit-rate, the lead-in video-stream being encoded at a second bit-rate, wherein the second bit-rate represents a lower number of bits per frame than a number of bits per frame represented by the first bit-rate, wherein the second bit-rate is determined by a function based at least in part on a request time and a next access point transmission time, the request time corresponding to choosing the particular main video-stream transmission, the next access point transmission time corresponding to transmission of the next access point transmitted in the main video-stream transmission following the request time, wherein if a first difference between a first request time and the next access point transmission time is less than a second difference between a second request time and the next access point transmission time, a first calculated bit-rate associated with the first difference is smaller than a second calculated bit-rate associated with the second difference;
   switching reception from the lead-in to the main video-stream transmission.

9. A medium as recited in claim 8 further comprising
   presenting content of the lead-in video stream transmission;
   after switching reception to the main video-stream, presenting the content of the main video-stream transmission.

10. A medium as recited in claim 8, wherein the switching is performed on or about the transmission of an access point in the main video-stream transmission.

11. A medium as recited in claim 8, wherein the switching is performed on or about the transmission of the next access point to occur during the main video-stream transmission.

12. A medium as recited in claim 8, wherein the video-stream transmissions are multicast.

13. A medium as recited in claim 8, wherein an available access point is an anchor frame.

14. A medium as recited in claim 8 further comprising:
   selecting one of multiple lead-in video-stream transmissions for reception, where each lead-in stream corresponds to a particular main video-stream transmission, wherein the one lead-in transmission selected is the lead-in transmission that is temporarily received;
   presenting content of the selected lead-in video stream transmission;
   switching reception from the lead-in to the main video-stream transmission and doing so on or about the occurrence of an access point transmitted in the main video-stream transmission;
   switching presentation from the content of the lead-in to the content of the main video-stream transmission.

15. A medium as recited in claim 14, wherein the access point of each of the multiple lead-in video-stream transmissions are scheduled for phase-staggered transmission relative to each other.

16. A computer storage medium having computer-executable instructions that, when executed by a computer, perform a method comprising:

preparing multiple video-streams based upon the same original video content for an overlapping transmission schedule so that the access point of each is phase-staggered, wherein a bit-rate is determined for each of the multiple video streams based at least in part on a set of request times and a next access point transmission time, the set of request times corresponding to times at which if a request for a main video-stream transmission occurs, the corresponding one of the multiple video-streams is transmitted, the next access point transmission time corresponding to transmission of the next access point transmitted in the main video-stream transmission following the set of request times, wherein a smaller difference between the set of request times and the next access point transmission time corresponds to a smaller bit-rate, the multiple video-streams being lead-in video streams corresponding to a portion of the main video-stream;

transmitting one of more of the multiple video-streams over a communications network in accordance with the overlapping transmission schedule.

17. A medium as recited in claim 16, wherein the transmission of the group-of-pictures (GOP) of each of the multiple streams ends on or about the same point in the transmission schedule.

18. A medium as recited in claim 16, wherein the multiple video-streams comprise a main stream and a lead-in stream.

\* \* \* \* \*